(12) United States Patent
Patel et al.

(10) Patent No.: US 12,434,204 B2
(45) Date of Patent: Oct. 7, 2025

(54) MEMBRANES CONTAINING CROWN ETHER-CONTAINING POLYMERS

(71) Applicant: Saudi Arabian Oil Company, Dhahran (SA)

(72) Inventors: Hasmukh A. Patel, Katy, TX (US); Sipei Li, Cambridge, MA (US); Yang Liu, Belmont, MA (US); Junyan Yang, Acton, MA (US)

(73) Assignee: Saudi Arabian Oil Company, Dhahran (SA)

( * ) Notice: Subject to any disclaimer, the term of this patent is extended or adjusted under 35 U.S.C. 154(b) by 850 days.

(21) Appl. No.: 17/550,069

(22) Filed: Dec. 14, 2021

(65) Prior Publication Data

US 2023/0182090 A1    Jun. 15, 2023

(51) Int. Cl.
*B01D 53/02* (2006.01)
*B01D 53/22* (2006.01)
*B01D 67/00* (2006.01)
*B01D 71/64* (2006.01)
*B01D 71/82* (2006.01)
*B01D 69/02* (2006.01)

(52) U.S. Cl.
CPC ........... *B01D 71/64* (2013.01); *B01D 53/228* (2013.01); *B01D 67/0093* (2013.01); *B01D 71/82* (2013.01); *B01D 69/02* (2013.01); *B01D 2257/504* (2013.01); *B01D 2323/36* (2013.01); *B01D 2325/20* (2013.01)

(58) Field of Classification Search
CPC ........ B01D 2256/245; B01D 2257/504; B01D 2323/36; B01D 2325/14; B01D 2325/16; B01D 2325/18; B01D 2325/20; B01D 53/228; B01D 67/0088; B01D 67/0093; B01D 69/02; B01D 71/64; B01D 71/82
See application file for complete search history.

(56) References Cited

U.S. PATENT DOCUMENTS

| 2013/0270188 A1* | 10/2013 | Karnik | ................ B01D 69/12 216/36 |
| 2020/0277441 A1 | 9/2020 | Stoddart et al. | |
| 2020/0308341 A1 | 10/2020 | Yan et al. | |
| 2024/0218127 A1 | 7/2024 | Yang et al. | |

FOREIGN PATENT DOCUMENTS

| CN | 106674560 | 11/2019 |
| WO | WO 2019090140 | 5/2019 |

OTHER PUBLICATIONS

Houben et al., "Plasticization behavior of crown-ether containing polyimide membranes for the separation of $CO_2$," Separation and Purification Technology, 2021, 255:117307, 10 pages.

(Continued)

*Primary Examiner* — Christopher P Jones
(74) *Attorney, Agent, or Firm* — Fish & Richardson P.C.

(57) ABSTRACT

This disclosure relates to membranes containing a polymer containing crown ether monomer units and a guest compound capable of binding thereto. This disclosure also relates to methods for making the membranes, and to methods for using the membranes for gas separation applications.

16 Claims, 4 Drawing Sheets

(56) References Cited

OTHER PUBLICATIONS

Kim et al., "Development of $CO_2$-Selective Polyimide-Based Gas Separation Membranes Using Crown Ether and Polydimethylsiloxane," Polymers, 2021, 13:1927, 15 pages.

Soto et al., "Self-assembly of a supramolecular network with pseudo-rotaxane cross-linking nodes and its transformation into a mechanically locked structure by rotaxane formation," Chemical Communications, 2016, 52:14149, 5 pages.

Wu et al., "A Crown Ether-Containing Copolyimide Membrane with Improved Free Volume for $CO_2$ Separation," Industrial & Engineering Chemical Research, 2019, 58:14357-14367, 44 pages.

Zhang et al., "Dibenzo-21-crown-7-ether contained 6FDA-based polyimide membrane with improved gas selectivity," Separation and Purification Technology, 2021, 264:118454, 13 pages.

Guo et al., "Synthesis and characterization of thermally rearranged (TR) polymers: effect of glass transition temperature of aromatic poly(hydroxyimide) precursors on TR process and gas permeation properties," J. Mater. Chem. A, Mar. 2013, 1:6063-6072, 10 pages.

Guo et al., "Synthesis and characterization of Thermally Rearranged (TR) polymers: influence of ortho-positioned functional groups of polyimide precursors on TR process and gas transport properties," J. Mater. Chem. A, 2013, 1:262-272, 11 pages.

Kraftschik et al., "Cross-Linkable Polyimide Membranes for Improved Plasticization Resistance and Permselectivity in Sour Gas Separations," Macromolecules, Aug. 2013, 46(17):6908-6921, 14 pages.

Liu et al., "Molecularly engineered 6FDA-based polyimide membranes for sour natural gas separation," Angewandte Chemie International Edition, 132, 14987-14993, 9 pages.

Liu et al., "Penetrant competition and plasticization in membranes: How negatives can be positives in natural gas sweetening," Journal of Membrane Science, Jun. 2021, 627:119201, 9 pages.

Wiegand et al., "Synthesis and characterization of triptycene-based polyimides with tunable high fractional free volume for gas separation membranes," J. Mater. Chem. A, Jun. 2014, 2:13309-13320, 12 pages.

Wu et al., "Preparation and gas permeation of crown ether-containing copolyimide with enhanced $CO_2$ selectivity," Journal of Membrane Science, Apr. 2018, 551:191-203, 13 pages.

Yi et al., "Ultraselective glassy polymer membranes with unprecedented performance for energy-efficient sour gas separation," Science Advances, May 2019, 12 pages.

Zhang et al., "Fluorescent Supramolecular Polymers Formed by Crown Ether-Based Host-Guest Interaction," Frontiers in Chemistry, Jul. 2020, 8:560, 19 pages.

SAIP Examination Report in Saudi Arabian Appln No. 122440868, dated Dec. 5, 2024, 17 pages (with English translation).

* cited by examiner

MEMBRANES CONTAINING CROWN ETHER-CONTAINING POLYMERS

TECHNICAL FIELD

The present disclosure relates to membranes containing a crown ether-containing polymer and a guest compound capable of binding thereto. The present disclosure also relates to methods of using the membranes for gas separation applications.

BACKGROUND

Natural gas supplies 22% of the energy used worldwide and makes up nearly a quarter of electricity generation, and also plays a crucial role as a feedstock for industry. Raw natural gas is formed primarily of methane ($CH_4$); however, it also contains significant amounts of other components, such as acid gases (for example, $CO_2$ and $H_2S$). The bulk removal of these gases will not only bring about significant savings in operation costs and in capital investments in post-treatment units, but will also make these units more tolerable to significant deviations in treatment loads (feed gas quality and flow), which is a challenge for gas processing in the plants.

A widely applied technology used for the removal of acid gas from gas mixtures is amine absorption; however, there are drawbacks associated with this technology, as it is very energy-intensive, has high capital cost and heavy maintenance requirements.

Another technology that has gained greater industrial application is the use of polymeric membrane-based technology for gas separation applications such as natural gas sweetening, oxygen enrichment, hydrogen purification, and nitrogen and organic compounds removal from natural gas. Though this technology has high energy efficiency, a small footprint (ease of processability into different configurations), and low capital cost, there exists a trade-off behavior between productivity (permeability) and efficiency (selectivity). Industrial applications of such membranes are still limited for bulk removal of aggressive acid gases from natural gas, due to low separation performance and high $CO_2$ plasticization.

Therefore, there is a need for high flux and gas-pair selective membranes for removing $CO_2$ from natural gas that can be used under industrial conditions and actual field environments and testing conditions, such as a membrane that has a combination of high permeability and high selectivity. There is also a need for a membrane having a high resistance to plasticization. There is also a need for a method of removing acid gases from gas mixtures using membranes that have improved permeability and selectivity, as well as enhanced plasticization resistance.

SUMMARY

Provided in the present disclosure is a membrane containing a polymer containing crown ether macrocycle monomer units, and a guest compound containing at least one functional group capable of binding to at least one of the crown ether macrocycle monomer units.

In some embodiments of the membrane, the crown ether macrocycle monomer units include one or more of 18-crown-6-ether monomer units, 24-crown-8-ether monomer units, and 12-crown-4-ether monomer units.

In some embodiments of the membrane, the polymer contains crown ether macrocycle monomer units linked by one or more of an imide group, a bicyclic aliphatic group, an ester group, an amide group, an azo group, and an ether group.

In some embodiments of the membrane, the polymer is a polyimide. In some embodiments, the polymer contains one or more of dibenzo-18-crown-6-ether monomer units, dibenzo-24-crown-8-ether monomer units, and dibenzo-12-crown-4-ether monomer units, bis(phthalimide) monomer units, and optionally, benzene monomer units.

In some embodiments of the membrane, the guest compound contains one, two, or three functional groups capable of binding to at least one of the crown ether macrocycle monomer units.

In some embodiments of the membrane, the guest compound is a salt containing $K^+$, $NH_4^+$, or $Li^+$.

In some embodiments of the membrane, the guest compound is an organic compound. In some embodiments, the guest compound contains one or more carboxylate groups. In some embodiments, the guest compound is an oligomer or polymer containing monomer units containing the at least one functional group.

In some embodiments of the membrane, the guest compound is a compound of Formula I-A

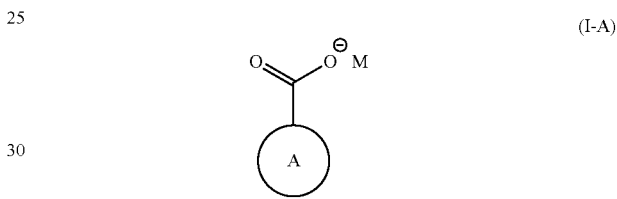

wherein
A is selected from phenyl, biphenyl, terphenyl, naphthalenyl, anthracenyl, and $C_{1-12}$ alkyl, each optionally substituted with one or more $R^1$;
each $R^1$ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and
M is selected from $K^+$, $NH_4^+$, and $Li^+$.

In some embodiments of Formula I-A, A is substituted with one or two $R^1$, each $R^1$ is independently selected from halogen, hydroxy, amino, and $C_1$ alkyl optionally substituted with one or more $R^{1a}$, and each $R^{1a}$ is independently selected from halogen, hydroxy, and amino.

In some embodiments of the membrane, the guest compound is a compound of Formula I-B

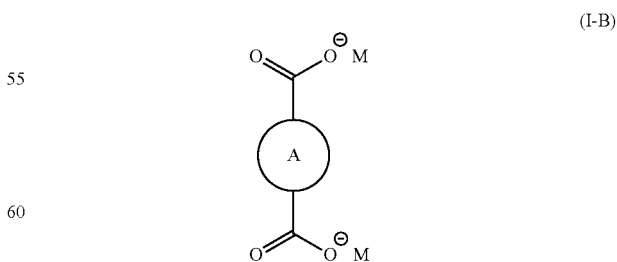

wherein
B is selected from phenylene, biphenylene, terphenylene, naphthalenylene, anthracenylene, and $C_{1-12}$ alkylene, each optionally substituted with one or more $R^1$;

each R¹ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and M is selected from $K^+$, $NH_4^+$, and $Li^+$.

In some embodiments of Formula I-B, B is substituted with one or two R¹, each R¹ is independently selected from halogen, hydroxy, amino, and $C_1$ alkyl optionally substituted with one or more $R^{1a}$, and each $R^{1a}$ is independently selected from halogen, hydroxy, and amino.

In some embodiments of the membrane, the guest compound is an inorganic compound. In some embodiments, the guest compound is a metal salt. In some embodiments, the guest compound is an oxalate salt.

In some embodiments of the membrane, the guest compound is a compound of Formula II $$M_nX \quad (II)$$

wherein

M is selected from $K^+$, $NH_4^+$, and $Li^+$;

X is selected from $OH^-$, $CO_3^{2-}$, $C_2O_4^{2-}$, $F^-$, $Cl^-$, $Br^-$, $I^-$, $MnO_4^-$, $PO_4^{3-}$, $SO_4^{2-}$, and $NO_3^-$; and n is selected such that the overall charge of the compound of Formula II is 0.

In some embodiments of the membrane, the ratio of the functional groups present in the membrane to the crown ether macrocycle monomer units present in the membrane is within the range of about 20:1 to about 1:20.

In some embodiments of the membrane, the polymer and the guest compound make up at least about 80 wt % of the membrane.

Also provided in the present disclosure is a membrane containing an inclusion complex. The inclusion complex contains a polymer containing crown ether macrocycle monomer units and a guest compound, and the guest compound is bound to at least a portion of the crown ether macrocyclic monomer units.

In some embodiments of the inclusion complex-containing membrane, the polymer contains one or more of dibenzo-18-crown-6-ether monomer units, dibenzo-24-crown-8-ether monomer units, and dibenzo-12-crown-4-ether monomer units, bis(phthalimide) monomer units, and optionally, benzene monomer units.

In some embodiments of the inclusion complex-containing membrane, the guest compound is a compound of Formula I-A

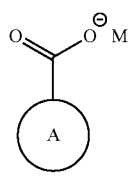

(I-A)

wherein

A is selected from phenyl, biphenyl, terphenyl, naphthalenyl, anthracenyl, and $C_{1-12}$ alkyl, each optionally substituted with one or more R¹;

each R¹ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and M is selected from $K^+$, $NH_4^+$, and $Li^+$.

In some embodiments of the inclusion complex-containing membrane, the guest compound is a compound of Formula I-B

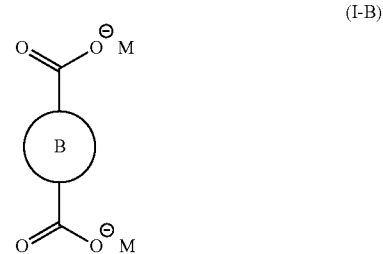

(I-B)

wherein

B is selected from phenylene, biphenylene, terphenylene, naphthalenylene, anthracenylene, and $C_{1-12}$ alkylene, each optionally substituted with one or more R¹;

each R¹ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and M is selected from $K^+$, $NH_4^+$, and $Li^+$.

In some embodiments of Formula I-B, at least a portion of the guest compound present in the membrane is bound to two crown ether macrocyclic monomer units.

In some embodiments of the inclusion complex-containing membrane, the guest compound is a compound of Formula II $$M_nX \quad (II)$$

wherein

M is selected from $K^+$, $NH_4^+$, and $Li^+$;

X is selected from $OH^-$, $CO_3^{2-}$, $C_2O_4^{2-}$, $F^-$, $Cl^-$, $Br^-$, $I^-$, $MnO_4^-$, $PO_4^{3-}$, $SO_4^{2-}$, and $NO_3^-$; and n is selected such that the overall charge of the guest compound is 0.

In some embodiments of the inclusion complex-containing membrane, at least about 10% of the crown ether macrocycle monomer units present in the membrane are bound to a guest compound.

In some embodiments, the inclusion complex-containing membrane has a $CO_2$ permeability of at least about 5 Barrer and a $CO_2/CH_4$ perm-selectivity of at least about 30.

Also provided in the present disclosure is a method for separating $CO_2$ from natural gas. The method includes providing a membrane containing a polymer comprising crown ether macrocycle monomer units and a guest compound comprising at least one functional group capable of binding to at least one of the crown ether macrocycle monomer units, introducing a natural gas stream to the membrane, and separating the $CO_2$ from the natural gas.

In some embodiments of the method, the polymer contains one or more of diaminobenzo-18-crown-6-ether monomer units, diaminobenzo-24-crown-8-ether monomer units, and diaminobenzo-12-crown-4-ether monomer units, bis(phthalimide) monomer units, and optionally, diaminobenzene monomer units, and the guest compound is a salt containing $K^+$, $NH_4^+$, or $Li^+$.

DETAILED DESCRIPTION

Figure 1:
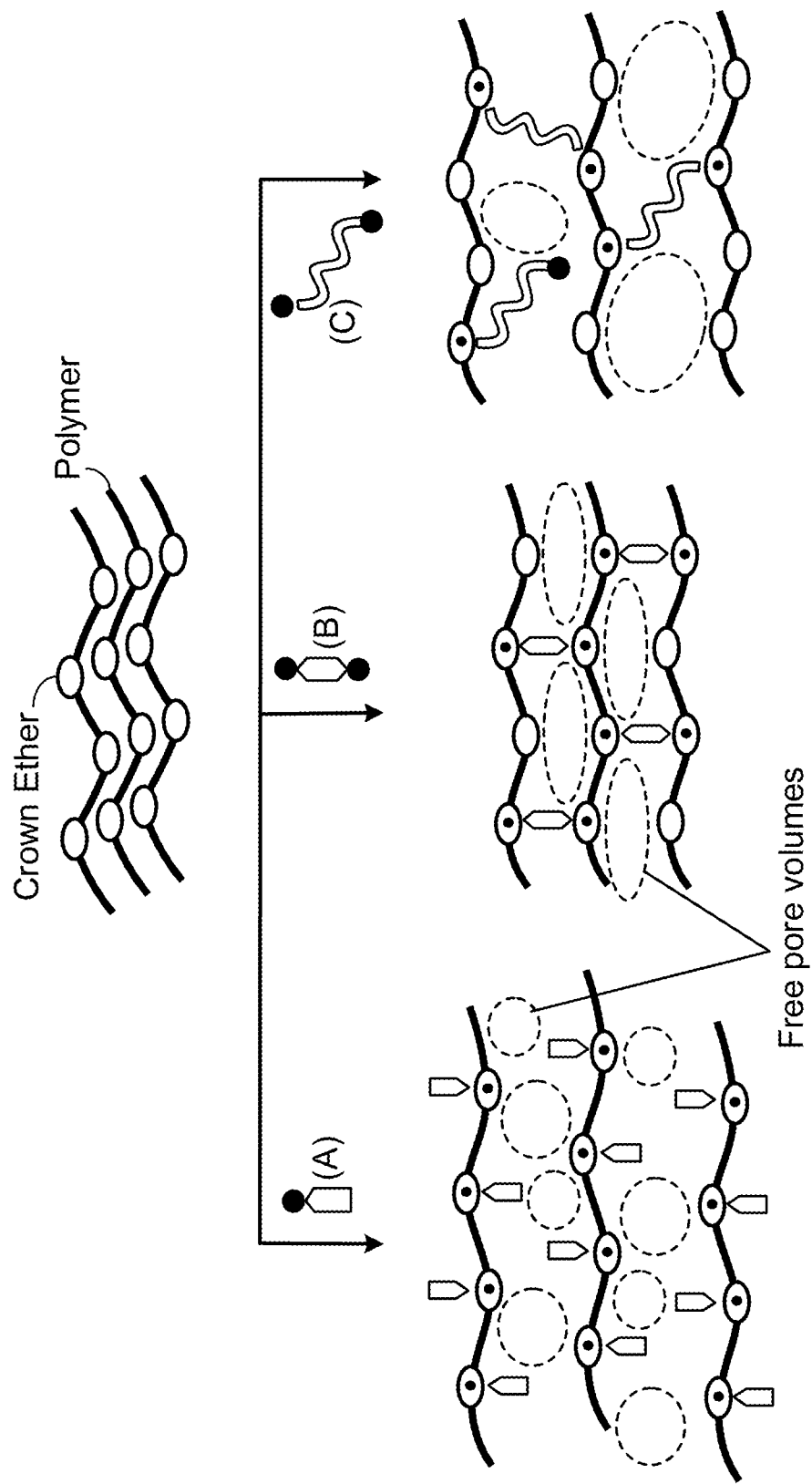
FIG. 1 is a schematic illustration of exemplary inclusion complexes resulting from binding of a polymer containing crown ether macrocycle monomer units to guest compounds (A), (B), and (C).

The present disclosure relates to membranes that can be used for industrial gas processing. In some embodiments, the membranes have a combination of high permeability and high selectivity. In some embodiments, the membranes are resistant to plasticization. In some embodiments, the membranes have a combination of high permeability and high selectivity, while at the same time remain resistant to plasticization. The present disclosure relates to membranes containing a polymer containing crown ether monomer units and a guest compound capable of binding thereto. The present disclosure also relates to methods for making and using the membranes for gas separation applications. In some embodiments, the membranes contain a supramolecular structure having properties (such as free volume, chemical affinity, or both) concomitant with the features of the guest compound (such as length, number of binding groups, and other chemical functionalization). The membranes of the present disclosure demonstrate significant improvement in membrane separation performance and enhanced plasticization resistance at a feed pressure up to about 700 psi as compared to conventional polymer-based membranes.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used in the present disclosure can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, the term "monomer unit," used in reference to a polymer, refers to a monomer, or residue of a monomer, that has been incorporated into at least a portion of the polymer.

As used in the present disclosure, the term "polymerization product," used in reference to one or more monomers, refers to a polymer that can be formed by a chemical reaction of the one or more monomers. For example, a "polymerization product" of acrylic acid is a polymer containing acrylic acid monomer units.

As used in the present disclosure, the terms "crown ether macrocycle" and "crown ether" are interchangeable and refer to a cyclic polyether group containing at least 3 oxygen atoms, where each oxygen atom is separated from the other oxygen atoms by at least 2 carbon atoms.

As used in the present disclosure, the terms "crown ether macrocycle monomer units" and "crown ether monomer units" are interchangeable and refer to a monomer unit containing a crown ether group. Similarly, for example, the term "18-crown-6-ether monomer unit" refers to a monomer unit containing an 18-crown-6-ether group, while the term "24-crown-8-ether monomer unit" refers to a monomer unit containing a 24-crown-8-ether group.

As used in the present disclosure, the term "guest compound" refers to inorganic or organic compounds containing at least one functional group that can non-covalently bind to a crown ether macrocycle to form an inclusion complex of the crown ether macrocycle and the at least one functional group. This binding can also be referred to as a "host-guest" interaction. The entirety of the guest compound need not fit within the cavity of the crown ether macrocycle. For example, in some embodiments, the guest compound is $K^+$—$Br^-$ and the crown ether macrocycle is an 18-crown-6-ether, and binding of the $K^+$ to the 18-crown-6-ether forms an inclusion complex in which the $K^+$ is located within the cavity of the crown ether macrocycle and the $Br^-$ is located outside of the cavity.

As used in the present disclosure, the term "small molecule" refers to an organic compound having a molecular weight of less than about 900 Da.

Membrane Materials

Provided in the present disclosure are membranes that contain a polymer containing crown ether macrocycle units, and a guest compound containing at least one functional group capable of binding to at least one of the crown ether macrocycle monomer units.

In some embodiments, the polymer and the guest compound make up at least about 60 wt %, at least about 65 wt %, at least about 70 wt %, at least about 75 wt %, at least about 80 wt %, at least about 85 wt %, at least about 90 wt %, at least about 92.5 wt %, at least about 95 wt %, at least about 97.5 wt %, at least about 98 wt %, at least about 98.5 wt %, at least about 99 wt %, at least about 99.5 wt %, or at least about 99.9 wt % of the membrane. In some embodiments, the polymer and the guest compound make up at least about 95 wt % of the membrane. In some embodiments, the membrane is made up substantially of the polymer and the guest compound.

In some embodiments, the guest compound contains one, two, three, four, or more functional groups capable of binding to at least one of the crown ether macrocycle monomer units. In some embodiments, the guest compound contains one, two, or three functional groups capable of binding to at least one of the crown ether macrocycle monomer units. In some embodiments, the guest compound contains one functional group capable of binding to at least one of the crown ether macrocycle monomer units. In some embodiments, the guest compound contains two functional groups capable of binding to at least one of the crown ether macrocycle monomer units.

In some embodiments, the ratio of the functional groups present in the membrane to the crown ether macrocycle monomer units present in the membrane is within the range of about 20:1 to about 1:20, for example, about 20:1 to about 1:15, about 20:1 to about 1:10, about 20:1 to about 1:5, about 20:1 to about 1:2, about 20:1 to about 1:1, about 15:1 to about 1:20, about 15:1 to about 1:15, about 15:1 to about 1:10, about 15:1 to about 1:5, about 15:1 to about 1:2, about 15:1 to about 1:1, about 10:1 to about 1:20, about 10:1 to about 1:15, about 10:1 to about 1:10, about 10:1 to about 1:5, about 10:1 to about 1:2, about 10:1 to about 1:1, about 5:1 to about 1:20, about 5:1 to about 1:15, about 5:1 to about 1:10, about 5:1 to about 1:5, about 5:1 to about 1:2, about 5:1 to about 1:1, about 2:1 to about 1:20, about 2:1 to about 1:15, about 2:1 to about 1:10, about 2:1 to about 1:5, about 2:1 to about 1:2, about 2:1 to about 1:1, about 1:1 to about 1:20, about 1:1 to about 1:15, about 1:1 to about 1:10, about 1:1 to about 1:5, or about 1:1 to about 1:2. In some embodiments, the ratio of the functional groups present in the membrane to the crown ether macrocycle monomer units present in the membrane is about 2:1 to about 1:1. In some embodiments, the ratio of the functional groups present in the membrane to the crown ether macrocycle monomer units present in the membrane is about 1:1.

Crown Ether-Containing Polymers

The membranes of the present disclosure contain a polymer containing crown ether macrocycle monomer units. In some embodiments, the crown ether macrocycle monomer units contain one or more of 18-crown-6-ether monomer units, 24-crown-8-ether monomer units, and 12-crown-4-ether monomer units. In some embodiments, the crown ether macrocycle monomer units contain dibenzo-crown ether macrocycles, for example, dibenzo-18-crown-6-ether monomer units, dibenzo-24-crown-8-ether monomer units, or dibenzo-12-crown-4-ether monomer units. In some embodiments, the crown ether macrocycle monomer units make up at least about 5%, at least about 10%, at least about 20%, at least about 30%, at least about 40%, at least about 50%, at least about 60%, at least about 70%, at least about 80%, at least about 90%, at least about 95%, or at least about 99% of the monomer units of the polymer. In some embodiments, the crown ether macrocycle monomer units make up about 5% to about 45%, for example, about 5%, about 10%, about 15%, about 20%, about 25%, about 30%, about 35%, about 35%, or about 45% of the monomer units of the polymer. In some embodiments, the crown ether macrocycle monomer units make up about 25% of the monomer units of the polymer.

In some embodiments, the polymer contains a crown ether macrocycle monomer unit of Formula III

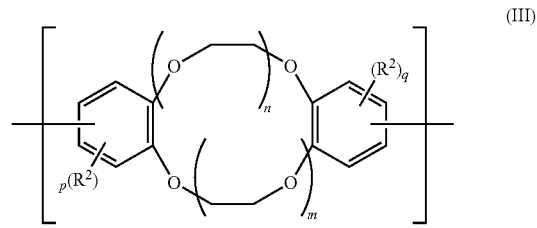

wherein
n and m are each independently 1, 2, 3, 4, or 5;
the sum of n and m is 2, 3, 4, 5, or 6;
p and q are each independently 0, 1, 2, or 3; and
each $R^2$ is independently halogen or $C_{1-4}$ alkyl optionally substituted with one or more halogen.

In some embodiments of Formula III, n and m are each independently 1, 2, or 3. In some embodiments, n and m are each 1, or n and m are each 2, or n and m are each 3. In some embodiments, the sum of n and m is 6, 4, or 2. In some embodiments, p and q are each independently 0 or 1. In some embodiments, p and q are each 0. In some embodiments, the crown ether macrocycle monomer units of Formula III make up at least about 5%, at least about 10%, at least about 20%, at least about 30%, at least about 40%, at least about 50%, at least about 60%, at least about 70%, at least about 80%, at least about 90%, at least about 95%, or at least about 99% of the monomer units of the polymer. In some embodiments, the crown ether macrocycle monomer units of Formula III make up about 5% to about 45%, for example, about 5%, about 10%, about 15%, about 20%, about 25%, about 30%, about 35%, about 35%, or about 45% of the monomer units of the polymer. In some embodiments, the crown ether macrocycle monomer units of Formula III make up about 25% of the monomer units of the polymer.

In some embodiments, the polymer contains one or more linking groups selected from an imide group:

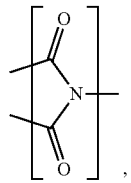

a bicyclic aliphatic group, such as a group derived from Tröger's base, for example:

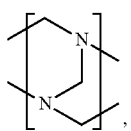

an ester group:

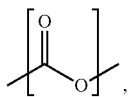

an amide group:

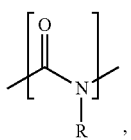

an azo group:

and an ether group:

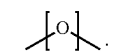

In some embodiments, the polymer contains imide linking groups, that is, the polymer is a polyimide. In some embodiments, the polymer is a polyimide containing the crown ether macrocycle monomer units and diimide monomer units. In some embodiments, the crown ether macrocycle monomer units containing dibenzo-crown ether macrocycles. In some embodiments, the crown ether macrocycle monomer units and the diimide monomer units make up at least about 20%, at least about 30%, at least about 40%, at least about 50%, at least about 60%, at least about 70%, at least about 80%, at least about 90%, at least about 95%, or at least about 99% of the monomer units of the polymer. In some embodiments, the crown ether macrocycle monomer units and the diimide monomer units make up about 55% to about 95%, for example, about 55%, or about 60%, or about 65%, or about 70%, or about 75%, or about 80%, or about 85%, or about 90%, or about 95% of the monomer units of the polymer. In some embodiments, the crown ether macrocycle monomer units and the diimide monomer units make up about 75% of the monomer units of the polymer. In some embodiments, the polymer is the polymerization product of a diaminobenzo-crown ether and a dianhydride. In some embodiments, the diaminobenzo-crown ether is diaminobenzo-18-crown-6-ether, diaminobenzo-24-crown-8-ether, diaminobenzo-12-crown-4-ether monomer, or any combination thereof.

In some embodiments, the polymer is a polyimide containing the crown ether macrocycle monomer units, diimide monomer units, and benzene monomer units. In some embodiments, the crown ether macrocycle monomer units contain dibenzo-crown ether macrocycles. In some embodiments, the crown ether macrocycle monomer units, the diimide monomer units, and the benzene monomer units make up at least about 20%, at least about 30%, at least about 40%, at least about 50%, at least about 60%, at least about 70%, at least about 80%, at least about 90%, at least about 95%, or at least about 99% of the monomer units of the polymer. In some embodiments, the crown ether macrocycle monomer units, the diimide monomer units, and the benzene monomer units make up about 75% to about 100%, for example, about 75%, about 80%, about 85%, about 90%, about 95%, or about 100% of the monomer units of the polymer. In some embodiments, the crown ether macrocycle monomer units, the diimide monomer units, and the benzene monomer units make up about 100% of the monomer units of the polymer. In some embodiments, the polymer is the polymerization product of a diaminobenzo-crown ether, a dianhydride, and a diaminobenzene. In some embodiments, the diaminobenzo-crown ether is diaminobenzo-18-crown-6-ether, diaminobenzo-24-crown-8-ether, diaminobenzo-12-crown-4-ether monomer, or any combination thereof.

In some embodiments, the diimide monomer units contain bis(phthalimide) monomer units. In some embodiments, the diimide monomer units contain (4,4'-hexafluoroisopropylidene) bis(phthalimide) monomer units. In some embodiments, the benzene monomer units contain 2,4,6-trimethylbenzene monomer units. In some embodiments, the polymer is the polymerization product of a diaminobenzo-crown ether, 4,4'-(hexafluoroisopropylidene)diphthalic anhydride, and 2,4,6-trimethyl-1,3-diaminobenzene. In some embodiments, the diaminobenzo-crown ether is diaminobenzo-18-crown-6-ether, diaminobenzo-24-crown-8-ether, diaminobenzo-12-crown-4-ether monomer, or any combination thereof.

In some embodiments, the polymer is a polyimide containing a crown ether macrocycle monomer unit of Formula III of the present disclosure, and a monomer unit of Formula IV

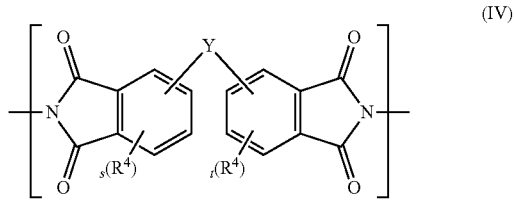

wherein
  Y is $C_{1-4}$ alkylene, optionally substituted with one or more $R^3$
  each $R^3$ is independently selected from halogen, hydroxy, amino, thio, carboxy, azido, and $C_{1-4}$ alkyl optionally substituted with one or more $R^{3a}$, wherein each $R^{3a}$ is independently selected from halogen, hydroxy, amino, thio, carboxy, or azido;
  s and t are each independently 0, 1, 2, or 3; and
  each $R^4$ is independently halogen or $C_{1-4}$ alkyl optionally substituted with one or more halogen.

In some embodiments of Formula IV, Y is $C_1$ alkylene, optionally substituted with one or two $R^3$. In some embodiments, one or more $R^3$ are each independently $C_1$ alkyl optionally substituted with one, two, or three halogen. In some embodiments, s and t are each independently 0 or 1. In some embodiments, s and t are each 0.

In some embodiments, the polymer is a polyimide containing a crown ether macrocycle monomer unit of Formula III of the present disclosure, a monomer unit of Formula IV of the present disclosure, and a monomer unit of Formula V

wherein
C is selected from phenylene, biphenylene, terphenylene, naphthalenylene, anthracenylene, and $C_{1-12}$ alkylene, each optionally substituted with one or more $R^5$;
each $R^5$ is independently selected from halogen, hydroxy, amino, thio, carboxy, azido, and $C_{1-4}$ alkyl optionally substituted with one or more $R^{5a}$, wherein each $R^{5a}$ is independently selected from halogen, hydroxy, amino, thio, carboxy, and azido.

In some embodiments of Formula V, C is phenylene, optionally substituted with one, two, or three $R^5$. In some embodiments, one or more $R^5$ are each independently $C_1$ alkyl optionally substituted with one, two, or three halogen.

In some embodiments, the polymer includes bicyclic aliphatic liking groups. For example, in some embodiments, the polymer contains structural repeat units selected from Formula VI-A and Formula VI-B:

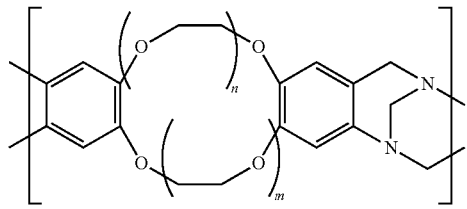

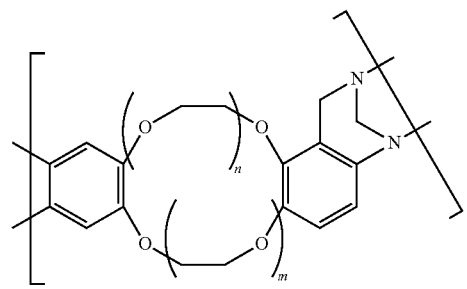

wherein
n and m are each independently 1, 2, 3, 4, or 5;
the sum of n and m is 2, 3, 4, 5, or 6; and
p and q are each independently 0, 1, 2, or 3.

In some embodiments of Formula VI-A and Formula VI-B, n and m are each independently 1, 2, or 3. In some embodiments, n and m are each 1. In some embodiments, n and m are each 2. In some embodiments, n and m are each 3. In some embodiments, the sum of n and m is 6. In some embodiments, the sum of n and m is 4. In some embodiments, the sum of n and m is 2.

Guest Compounds

The membranes of the present disclosure contain a guest compound containing at least one functional group capable of binding to at least one of the crown ether macrocycle monomer units of the crown ether-containing polymers of the present disclosure. In some embodiments, the guest compound contains one, two, three, four, or more functional groups capable of binding to at least one of the crown ether macrocycle monomer units. In some embodiments, the guest compound contains one, two, or three functional groups capable of binding to at least one of the crown ether macrocycle monomer units. In some embodiments, the guest compound contains one functional group capable of binding to at least one of the crown ether macrocycle monomer units. In some embodiments, the guest compound contains two functional groups capable of binding to at least one of the crown ether macrocycle monomer units.

In some embodiments, the functional group contains a cation having a binding affinity for at least one of the crown ether macrocycle monomer units. In some embodiments, the guest compound is a salt. In some embodiments, the guest compound is an inorganic salt. In some embodiments, the guest compound is an organic salt. In some embodiments, the guest compound is a salt containing $K^+$, $NH_4^+$, or $Li^+$. In some embodiments, the guest compound is an inorganic salt containing $K^+$, $NH_4^+$, or $Li^+$. In some embodiments, the guest compound is an organic salt containing $K^+$, $NH_4^+$, or $Li^+$.

In some embodiments, the guest compound is an organic compound. In some embodiments, the guest compound is a small molecule. In some embodiments, the guest compound is an oligomer. In some embodiments, the guest compound is a polymer. In some embodiments, the guest compound contains one or more carboxylate groups. In some embodiments, the guest compound contains one or more cation carboxylate groups. In some embodiments, the guest compound contains one or more potassium carboxylate groups, ammonium carboxylate groups, or lithium carboxylate groups.

In some embodiments, the guest compound is a small molecule containing one, two, or three functional groups capable of binding to at least one of the crown ether macrocycle monomer units. In some embodiments, the guest compound is a small molecule containing $K^+$, $NH_4^+$, or $Li^+$. In some embodiments, the guest compound is an oligomer or polymer containing monomer units containing the at least one functional group. In some embodiments, the monomer units containing the at least one functional group include acrylic acid monomer units. In some embodiments, the guest compound is a cation oligoacrylate. In some embodiments, the cation oligoacrylate is potassium oligoacrylate, ammonium oligoacrylate, or lithium oligoacrylate. In some embodiments, the guest compound is a cation polyacrylate. In some embodiments, the cation polyacrylate is potassium polyacrylate, ammonium polyacrylate, or lithium polyacrylate.

In some embodiments, the guest compound is a compound of Formula I-A

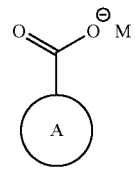

wherein
  A is selected from phenyl, biphenyl, terphenyl, naphthalenyl, anthracenyl, and $C_{1-12}$ alkyl, each optionally substituted with one or more $R^1$;
  each $R^1$ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and
  M is selected from $K^+$, $NH_4^+$, and $Li^+$.

In some embodiments of Formula I-A, A is unsubstituted. In some embodiments, A is substituted with one, two, three, four, five, or six $R^1$. In some embodiments, A is substituted with one or two $R^1$. In some embodiments, A is phenyl optionally substituted with one or two $R^1$. In some embodiments, A is biphenyl or naphthalenyl, each optionally substituted with three or four $R^1$. In some embodiments, A is terphenyl or anthracenyl, each optionally substituted with five or six $R^1$. In some embodiments, A is $C_{1-12}$ alkyl, optionally substituted with one to six $R^1$.

In some embodiments of Formula I-A, each $R^1$ is independently selected from halogen, hydroxy, amino, and $C_{1-4}$ alkyl optionally substituted with one or more Ria. In some embodiments, each $R^{1a}$ is independently selected from halogen, hydroxy, and amino. In some embodiments, each $R^1$ is independently selected from halogen and $C_1$ alkyl substituted with one, two, or three halogen.

In some embodiments, the guest compound is a compound of Formula I-B

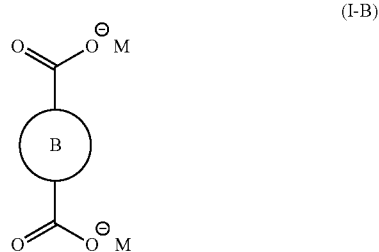

(I-B)

wherein
  B is selected from phenylene, biphenylene, terphenylene, naphthalenylene, anthracenylene, and $C_{1-12}$ alkylene, each optionally substituted with one or more $R^1$;
  each $R^1$ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and
  M is selected from $K^+$, $NH_4^+$, and $Li^+$.

In some embodiments of Formula I-B, B is unsubstituted. In some embodiments, B is substituted with one, two, three, four, five, or six $R^1$. In some embodiments, B is substituted with one or two $R^1$. In some embodiments, B is phenylene optionally substituted with one or two $R^1$. In some embodiments, B is biphenylene or naphthalenylene, each optionally substituted with three or four $R^1$. In some embodiments, B is terphenylene or anthracenylene, each optionally substituted with five or six $R^1$. In some embodiments, B is $C_{1-12}$ alkylene, optionally substituted with one to six $R^1$.

In some embodiments of Formula I-B, each $R^1$ is independently selected from halogen, hydroxy, amino, and $C_{1-4}$ alkyl optionally substituted with one or more $R^{1a}$. In some embodiments, each $R^{1a}$ is independently selected from halogen, hydroxy, and amino. In some embodiments, each $R^1$ is independently selected from halogen and $C_1$ alkyl substituted with one, two, or three halogen.

In some embodiments, the guest compound is an inorganic compound. In some embodiments, the guest compound is a metal salt. In some embodiments, the metal salt contains $K^+$, $NH_4^+$, or $Li^+$. In some embodiments, the metal salt is an oxalate salt. In some embodiments, the oxalate salt contains $K^+$, $NH_4^+$, or $Li^+$.

In some embodiments, the guest compound is a compound of Formula II $$M_nX \qquad\qquad (II)$$

wherein
  M is selected from $K^+$, $NH_4^+$, and $Li^+$;
  X is selected from $OH^-$, $CO_3^{2-}$, $C_2O_4^{2-}$, $F^-$, $Cl^-$, $Br^-$, $I^-$, $MnO_4^-$, $PO_4^{3-}$, $SO_4^{2-}$, and $NO_3^-$; and n is selected such that the overall charge of the compound of Formula II is 0.

In some embodiments of Formula II, X is $OH^-$, $MnO^{4-}$, or $NO_3^-$. In some embodiments, X is $F^-$, $Cl^-$, $Br^-$, or $I^-$. In some embodiments, X is $Cl^-$ or $Br^-$. In some embodiments, X is $CO_3^{2-}$, $C_2O_4^{2-}$, $SO_4^{2-}$, or $PO_4^{3-}$. In some embodiments, M is $K^+$ and X is $Cl^-$ or $Br^-$. In some embodiments, M is $K^+$ and X is $Br^-$.

Inclusion Complexes

Also provided in the present disclosure are membranes that contain an inclusion complex containing a polymer of the present disclosure and a guest compound of the present disclosure, the guest compound being bound to at least a portion of the crown ether macrocyclic monomer units of the polymer. In some embodiments, the inclusion complex contains a supramolecular structure formed from the polymer and the guest compound. In some embodiments, properties of the guest compound, including, but not limited to, size and shape of the guest compound and the number and orientation of the functional groups capable of binding to the crown ether monomer units, direct the orientation and spacing of the polymer within the inclusion complex. In some embodiments, chemical properties of the guest compound affect the chemical affinity of the free pore volume within the inclusion complex.

For example, FIG. 1 is a schematic illustration of exemplary inclusion complexes resulting from binding of a polymer containing crown ether macrocyclic monomer units to (A) a relatively rigid guest compound containing one functional group capable of binding the crown ether monomer units; (B) a relatively rigid guest compound containing two functional groups capable of binding the crown ether monomer units; and (C) a relatively flexible guest compound containing two functional groups capable of binding the crown ether monomer units. For example, in some embodiments, the polymer of FIG. 1 can contain 18-crown-6-ether monomer units. For example, guest compound (A) of FIG. 1 can be a compound of Formula I-A where A is phenyl. In another example, in some embodiments, guest compound (A) of FIG. 1 can be a compound of Formula II where n is 1. For example, in some embodiments, guest compound (B) of FIG. 1 can be a compound of Formula II-A where A is phenyl. In another example, in some embodiments, guest compound (B) of FIG. 1 can be a compound of Formula II where n is 2. For example, in some embodiments, guest compound (C) of FIG. 1 can be a compound of Formula II-A where A is $C_{6-12}$ alkylene. In the embodiments of FIG. 1, the chemical affinity of the free pore volume of the of the inclusion complexes can depend at least partially on the chemical properties of the guest compounds, such as the number and identity of $R^1$ groups of Formula I-A and II-A, or the identity of X of Formula II.

In some embodiments of the inclusion complex, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 97.5%, at least about 98%, at least about 98.5%, at least about 99%, at least about 99.5%, or at least about 99.9% of the crown ether macrocycle monomer units present in the membrane are bound to a guest compound. In some embodiments of the inclusion complex, substantially all of the crown ether macrocycle monomer units present in the membrane are bound to a guest compound.

In some embodiments of the inclusion complex, the guest compound contains two or more functional groups capable of binding to at least one of the crown ether macrocycle monomer units. In some embodiments of the inclusion complex, the guest compound is a compound of Formula I-B of the present disclosure, where n is 2 or 3. In some embodiments of the inclusion complex, the guest compound is a compound of Formula II of the present disclosure, where n is 2 or 3. In some embodiments of the inclusion complex, at least a portion of the guest compound present in the membrane is bound to two or more crown ether macrocyclic monomer units. In some embodiments of the inclusion complex, the guest compound is a compound of Formula I-B of the present disclosure, and at least a portion of the guest compound is bound to two crown ether macrocyclic monomer units.

In some embodiments of the inclusion complex, the crown ether macrocycle monomer units contain one or more of 18-crown-6-ether monomer units, 24-crown-8-ether monomer units, and 12-crown-4-ether monomer units, and the guest compound is a salt containing $K^+$, $NH_4^+$, or $Li^+$. In some embodiments, the inclusion complex contains 18-crown-6-ether monomer units bound to a guest compound containing $K^+$. In some embodiments, the inclusion complex contains 24-crown-8-ether monomer units bound to a guest compound containing $NH_4$. In some embodiments, the inclusion complex contains 12-crown-4-ether monomer units bound to a guest compound containing $Li^+$.

In some embodiments of the inclusion complex, the polymer contains a crown ether macrocycle monomer unit of Formula III of the present disclosure, and the guest compound is a compound of Formula I-A of the present disclosure, a compound of Formula I-B of the present disclosure, or a compound of Formula II of the present disclosure. In some embodiments of the inclusion complex, the guest compound is a compound of Formula I-A, Formula I-B, or Formula II where M is $K^+$, and the polymer contains a crown ether macrocycle monomer unit of Formula III where the sum of n and m is 4. In some embodiments of the inclusion complex, the guest compound is a compound of Formula I-A, Formula I-B, or Formula II where M is $NH_4$, and the polymer contains a crown ether macrocycle monomer unit of Formula III where the sum of n and m is 6. In some embodiments of the inclusion complex, the guest compound is a compound of Formula I-A, Formula I-B, or Formula II where M is $Li^+$, and the polymer contains a crown ether macrocycle monomer unit of Formula III where the sum of n and m is 2.

In some embodiments of the inclusion complex, the polymer is a polyimide containing the crown ether macrocycle monomer units, and the guest compound is a compound of Formula I-A of the present disclosure, a compound of Formula I-B of the present disclosure, or a compound of Formula II of the present disclosure. In some embodiments, the polymer is a polyimide containing dibenzo-crown ether macrocycle monomer units and diimide monomer units. In some embodiments of the inclusion complex, the polymer is the polymerization product of a diaminobenzo-crown ether and a dianhydride. In some embodiments, the polymer is a polyimide containing dibenzo-crown ether macrocycles, diimide monomer units, and benzene monomer units. In some embodiments of the inclusion complex, the polymer is the polymerization product of a diaminobenzo-crown ether, a dianhydride, and a diaminobenzene. In some embodiments of the inclusion complex, the diaminobenzo-crown ether is diaminobenzo-18-crown-6-ether, diaminobenzo-24-crown-8-ether, diaminobenzo-12-crown-4-ether monomer, or any combination thereof.

In some embodiments of the inclusion complex, the polymer is a polyimide containing a crown ether macrocycle monomer unit of Formula III of the present disclosure and a monomer unit of Formula IV of the present disclosure, and the guest compound is a compound of Formula I-A of the present disclosure, a compound of Formula I-B of the present disclosure, or a compound of Formula II of the present disclosure. In some embodiments of the inclusion complex, the guest compound is a compound of Formula I-A, Formula I-B, or Formula II where M is $K^+$, and the polymer contains a crown ether macrocycle monomer unit of Formula III, where the sum of n and m is 4, and a monomer unit of Formula IV. In some embodiments of the inclusion complex, the guest compound is a compound of Formula I-A, Formula I-B, or Formula II where M is $NH_4$, and the polymer contains a crown ether macrocycle monomer unit of Formula III where the sum of n and m is 6, and a monomer unit of Formula IV. In some embodiments of the inclusion complex, the guest compound is a compound of Formula I-A, Formula I-B, or Formula II where M is $Li^+$, and the polymer contains a crown ether macrocycle monomer unit of Formula III, where the sum of n and m is 2, and a monomer unit of Formula IV. In some embodiments of the inclusion complex, Y of Formula IV is $C_1$ alkylene, optionally substituted with one or two $R^3$. In some embodiments of the inclusion complex, one or more $R^3$ of Formula IV are each independently $C_1$ alkyl optionally substituted with one, two, or three halogen.

In some embodiments of the inclusion complex, the polymer is a polyimide containing a crown ether macrocycle monomer unit of Formula III of the present disclosure, a monomer unit of Formula IV of the present disclosure, and a monomer unit of Formula V of the present disclosure, and the guest compound is a compound of Formula I-A of the present disclosure, a compound of Formula I-B of the present disclosure, or a compound of Formula II of the present disclosure. In some embodiments of the inclusion complex, the guest compound is a compound of Formula I-A, Formula I-B, or Formula II where M is $K^+$, and the polymer contains a crown ether macrocycle monomer unit of Formula III, where the sum of n and m is 4, a monomer unit of Formula IV, and a monomer unit of Formula V. In some embodiments of the inclusion complex, the guest compound is a compound of Formula I-A, Formula I-B, or Formula II where M is $NH_4^+$, and the polymer contains a crown ether macrocycle monomer unit of Formula III where the sum of n and m is 6, a monomer unit of Formula IV, and a monomer unit of Formula V. In some embodiments of the inclusion complex, the guest compound is a compound of Formula I-A, Formula I-B, or Formula II where M is $Li^+$, and the polymer contains a crown ether macrocycle monomer unit of Formula III, where the sum of n and m is 2, a monomer unit of Formula IV, and a monomer unit of Formula V. In some embodiments of the inclusion complex, Y of Formula IV is $C_1$ alkylene, optionally substituted with one or two $R^3$, and C of Formula V is phenylene, optionally substituted with one, two, or three $R^5$. In some embodiments of the inclusion complex, one or more $R^3$ of Formula IV are each independently $C_1$ alkyl optionally substituted with one, two, or three halogen, and one or more $R^5$ of Formula V are each independently $C_1$ alkyl optionally substituted with one, two, or three halogen.

In some embodiments of the inclusion complex, at least a portion of the crown ether monomer units are linked to another crown ether monomer unit by a bicyclic aliphatic group, and the guest compound is a compound of Formula I-A of the present disclosure, a compound of Formula I-B of the present disclosure, or a compound of Formula II of the present disclosure. In some embodiments of the inclusion complex, the polymer contains structural repeat units of Formula VI-A of the present disclosure or Formula VI-B of the present disclosure, and the guest compound is a compound of Formula I-A of the present disclosure, a compound of Formula I-B of the present disclosure, or a compound of Formula II of the present disclosure.

In some embodiments of the inclusion complex, the guest compound is a compound of Formula I-A, Formula I-B, or Formula II where M is $K^+$, and the polymer contains structural repeat units of Formula VI-A where the sum of n and m is 4, repeat units of Formula VI-B where the sum of n and m is 4, or both. In some embodiments of the inclusion complex, the guest compound is a compound of Formula I-A, Formula I-B, or Formula II where M is $NH_4^+$, and the polymer contains structural repeat units of Formula VI-A where the sum of n and m is 6, repeat units of Formula VI-B where the sum of n and m is 6, or both. In some embodiments of the inclusion complex, the guest compound is a compound of Formula I-A, Formula I-B, or Formula II where M is $Li^+$, and the polymer contains structural repeat units of Formula VI-A where the sum of n and m is 2, repeat units of Formula VI-B where the sum of n and m is 2, or both.

Methods for Preparing Membranes

Also provided in the present disclosure are methods for preparing the membranes of the present disclosure. In some embodiments, provided in the present disclosure is a process for making a membrane containing an inclusion complex containing a polymer of the present disclosure and a guest compound of the present disclosure, the guest compound being bound to at least a portion of the crown ether macrocyclic monomer units of the polymer. In some embodiments, the methods include contacting a polymer of the present disclosure and a guest compound of the present disclosure.

In some embodiments, the method includes preparing a solution of a polymer of the present disclosure. In some embodiments, the polymer is added to a solvent and dissolved. In some embodiments, the solvent is an organic solvent. In some embodiments, the solvent is o-dichlorobenzene. In some embodiments, the polymer is dissolved at room temperature. In some embodiments, the polymer is dissolved completely in the solvent before proceeding to the next step. In some embodiments, the polymer is filtered. In some embodiments, the polymer is filtered with a PTFE filter. In some embodiments, the polymer contains one or more of 18-crown-6-ether monomer units, 24-crown-8-ether monomer units, and 12-crown-4-ether monomer units. In some embodiments, the polymer contains a crown ether macrocycle monomer unit of Formula III of the present disclosure, a monomer unit of Formula IV of the present disclosure, and optionally a monomer unit of Formula V of the present disclosure. In some embodiments, the polymer contains structural repeat units selected from Formula VI-A and Formula VI-B of the present disclosure.

In some embodiments, the solution containing the polymer is poured into a flat-bottomed container in order to prepare a film. In some embodiments, the film is dried to allow for evaporation of solvent. In some embodiments, the film is dried at room temperature. In some embodiments, the film is dried for up to about 12 hours at room temperature. In some embodiments, the film is dried at an elevated temperature. In some embodiments, the film is dried at an elevated temperature in a vacuum oven. In some embodiments, as the film is dried at an elevated temperature of about 60° C., about 70° C., about 80° C., about 90° C., or higher. In some embodiments, the film is dried in a vacuum oven at about 80° C. In some embodiments, the film is dried at an elevated temperature for at least about 12 hours, about 18 hours, about 24 hours, about 30 hours, about 36 hours, about 42 hours, about 48 hours, or more. In some embodiments, the film is dried at an elevated temperature for about 48 hours. In some embodiments, the film is dried in a vacuum oven at about 80° C. for about 48 hours.

In some embodiments, the polymer-containing film is contacted with a solution of the guest compound to form an inclusion complex containing at least a portion of the crown ether macrocycle units of the polymer and the guest compound. In some embodiments, the solution contains a solvent in which the polymer is insoluble. In some embodiments, the solution contains a solvent in which the polymer is sparingly soluble. In some embodiments, the solution contains a solvent in which the polymer is only partially soluble. In some embodiments, the solvent is water. In some embodiments, the contacting includes submerging the polymer-containing film in the solution of the guest compound for at least about 12 hours, at least about 18 hours, at least about 24 hours, at least about 30 hours, at least about 36 hours, at least about 42 hours, at least about 48 hours, or more. In some embodiments, the polymer-containing film is contacted with the guest compound-containing solution at room temperature. In some embodiments, the guest compound-containing solution is stirred. In some embodiments, the guest compound is a compound of Formula I-A, Formula I-B, or Formula II. In some embodiments, the compound is a compound of Formula II, and the solvent is an aqueous solvent. In some embodiments, the ratio of the functional groups present in the guest compound-containing solution to the crown ether macrocycle monomer units present in the film is at least about 1:1, at least about 2:1, at least about 3:1, at least 4:1, at least about 5:1, at least about 6:1, at least about 7:1, at least about 8:1, at least about 9:1, or at least about 10:1. In some embodiments, the ratio of the functional groups present in the guest compound-containing solution to the crown ether macrocycle monomer units present in the film is about 10:1.

In some embodiments, after contacting the guest compound-containing solution, the membrane is washed to remove unbound guest compound. In some embodiments, after contacting the guest compound-containing solution, the membrane is dried. In some embodiments, the membrane is washed with water. In some embodiments, the membrane is dried at an elevated temperature. In some embodiments, the membrane is dried at an elevated temperature in a vacuum oven. In some embodiments, the membrane is dried at an elevated temperature of about 60° C., about 70° C., about 80° C., about 90° C., or higher. In some embodiments, the film is dried in a vacuum oven at about 80° C. In some embodiments, the film is dried at an elevated temperature for at least about 12 hours, about 18 hours, about 24 hours, about 30 hours, about 36 hours, about 42 hours, about 48 hours, or more. In some embodiments, the film is dried at an elevated temperature for about 48 hours. In some embodiments, the film is dried in a vacuum oven at about 90° C. for about 48 hours.

In some embodiments, the method includes preparing a solution of a polymer of the present disclosure and a guest compound of the present disclosure, and allowing an inclusion complex to form. In some embodiments, the method includes allowing the inclusion complex to form while stirring. In some embodiments, preparing the solution includes adding the polymer and the guest compound to a solvent and dissolving the polymer and the guest compound. In some embodiments, preparing the solution includes adding the polymer to a solvent and dissolving the polymer to form a polymer-containing solution, and then adding the guest compound to the polymer-containing solution and dissolving the guest compound. In some embodiments, the solvent is an organic solvent. In some embodiments, the solvent is o-dichlorobenzene. In some embodiments, the polymer and the guest compound are dissolved at room temperature. In some embodiments, the polymer contains one or more of 18-crown-6-ether monomer units, 24-crown-8-ether monomer units, and 12-crown-4-ether monomer units. In some embodiments, the polymer contains a crown ether macrocycle monomer unit of Formula III of the present disclosure, a monomer unit of Formula IV of the present disclosure, and optionally a monomer unit of Formula V of the present disclosure. In some embodiments, the polymer contains structural repeat units of Formula VI-A or Formula VI-B of the present disclosure. In some embodiments, the guest compound is a compound of Formula I-A, Formula I-B, or Formula II. In some embodiments, the compound is a compound of Formula I-A or Formula I-B. In some embodiments, the ratio of the functional groups present in the solution to the crown ether macrocycle monomer units present in the solution is at least about 1:1, at least about 2:1, at least about 3:1, at least 4:1, at least about 5:1, at least about 6:1, at least about 7:1, at least about 8:1, at least about 9:1, or at least about 10:1.

Also provided in the present disclosure are membranes prepared by the methods of the present disclosure.

Methods of Using the Membranes

Polymeric membranes are thin semipermeable barriers that selectively separate some gas compounds from others. The membranes are dense films that do not operate as a filter, but rather separate gas compounds based on how well the different compounds dissolve into the membrane and diffuse through it (the solution-diffusion model). In some embodiments, the crown ether-containing polymer membranes of the present disclosure are useful for any gas separation application, including, but not limited to, natural gas sweetening, oxygen enrichment, hydrogen purification, and nitrogen and organic compounds removal from natural gas. In some embodiments, the membranes of the present disclosure are used for the bulk removal of acid gases from natural gas.

In some embodiments, the crown ether-containing polymer membranes of the present disclosure demonstrate improved gas transport properties in natural gas separation as compared to conventional polymer-based membranes. In some embodiments, the crown ether-containing polymer membranes of the present disclosure demonstrate one or more of high $CO_2$ permeability, high $CO_2/CH_4$ selectivity, and reduced membrane plasticization, for example, at a feed pressure up to about 700 psi, as compared to conventional polymer-based membranes such as cellulose acetate-based membranes, polyimide-based membranes, and poly(ether-block-amide)-based membranes.

In some embodiments, the crown ether-containing polymer membranes of the present disclosure exhibit improved thermal stability. In some embodiments, the temperature at 5% weight loss for the crown ether-containing polymer membranes of the present disclosure is at least about 325° C., such as about 330° C., about 335° C., about 340° C., about 345° C., about 350° C., about 355° C., about 360° C., about 365° C., about 370° C., about 375° C., or higher. In some embodiments, the temperature at 5% weight loss for the crown ether-containing polymer membranes of the present disclosure is about 365° C. In some embodiments, the temperature at 10% weight loss for the crown ether-containing polymer membranes of the present disclosure is at least about 375° C., such as about 380° C., about 385° C., about 390° C., about 395° C., about 400° C., about 405° C., about 410° C., about 415° C., about 420° C., about 425° C., or higher. In some embodiments, the temperature at 5% weight loss for the crown ether-containing polymer membranes of the present disclosure is about 410° C.

In some embodiments, the crown ether-containing polymer membranes of the present disclosure exhibit enhanced $CO_2$ plasticization resistance as compared to a conventional polyimide-based membrane. In some embodiments, the crown ether-containing polymer membranes of the present disclosure show no $CO_2$ plasticization (no increase in $CO_2$ permeability) up to about 300 psi $CO_2$ pressure. In some embodiments, the $CO_2$ permeability of the crown ether-containing polymer membranes of the present disclosure increases by less than about 300%, less than about 275%, less than about 250%, less than about 225%, or less than about 200% under feed pressures up to about 500 psi as compared to feed pressure of about 50 psi. In some embodiments, the $CO_2$ permeability of the crown ether-containing polymer membranes of the present disclosure increases by less than about 450%, less than about 425%, less than about 400%, less than about 375%, or less than about 350% under feed pressures up to about 700 psi as compared to feed pressure of about 50 psi In some embodiments, the crown ether-containing polymer membranes of the present disclosure exhibit a $CO_2/CH_4$ selectivity increase as compared to conventional polymer-based membranes. In some embodiments, the membranes exhibit a $CO_2/CH_4$ selectivity increase of about 50% or more, such as about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240%, about 250%, or more as compared to conventional polymer-based membranes such as cellulose acetate-based membranes, polyimide-based membranes, and poly(ether-block-amide)-based membranes.

In some embodiments, the crown ether-containing polymer membranes of the present disclosure demonstrate increased single gas selectivity for $CO_2/CH_4$ compared to conventional polymer-based membranes under the same testing conditions, such as feed temperature of 25° C. and feed pressure of 100 psi. In some embodiments, the crown ether-containing polymer membranes of the present disclosure have $CO_2/CH_4$ single gas selectivity ($\alpha CO_2/CH_4$) of about 40 or more, such as about 45 to about 105, about 45 to about 95, about 45 to about 85, about 55 to about 105, about 55 to about 95, about 55 to about 85, about 65 to about 105, about 65 to about 95, about 65 to about 85, or about 45, about 50, about 55, about 60, about 65, about 70, about 75, about 80, about 85, about 90, about 95, or about 100 when tested at feed temperature of 25° C. and feed pressure of 100 psi. In some embodiments, the crown ether-containing polymer membranes of the present disclosure have $CO_2/CH_4$ single gas selectivity ($\alpha CO_2/CH_4$) of about 70 to about 80 when tested at feed temperature of 25° C. and feed pressure of 100 psi.

In some embodiments, the crown ether-containing polymer membranes of the present disclosure have $CO_2/N_2$ single gas selectivity ($\alpha CO_2/N_2$) of about 10 or more, such as about 15 to about 40, or about 15 to about 35, or about 15 to about 30, or about 20 to about 40, or about 25 to about 40, or about 25 to about 35, or about 25 to about 30. In some embodiments, the crown ether-containing polymer membranes of the present disclosure have $CO_2/N_2$ single gas selectivity ($\alpha CO_2/N_2$) of about 20 to about 30.

Thus, provided in the present disclosure are methods of separating $CO_2$ from natural gas. The methods involve providing a membrane containing a polymer containing crown ether macrocycle monomer units and a guest compound containing at least one functional group capable of binding to at least one of the crown ether macrocycle monomer units, such as a membrane of the present disclosure, introducing a natural gas stream to the membrane, and separating the $CO_2$ from the natural gas. In some embodiments, the membrane is more permeable to $CO_2$ than to $CH_4$.

In some embodiments of the methods, the polymer contains one or more of 18-crown-6-ether monomer units, 24-crown-8-ether monomer units, and 12-crown-4-ether monomer units, and the guest compound is a salt containing $K^+$, $NH_4^+$, or $Li^+$. In some embodiments of the methods, the polymer is a polyimide containing the crown ether macrocycle monomer units. In some embodiments of the methods, the polymer is a polyimide containing dibenzo-crown ether macrocycles, diimide monomer units, and optionally benzene monomer units, and the guest compound is a salt containing $K^+$, $NH_4^+$, or $Li^+$.

In some embodiments of the methods, the polymer is a polyimide containing a crown ether macrocycle monomer unit of Formula III of the present disclosure, a monomer unit of Formula IV of the present disclosure, and a monomer unit of Formula V of the present disclosure, and the guest compound is a compound of Formula I-A of the present disclosure, a compound of Formula I-B of the present disclosure, or a compound of Formula II of the present disclosure. In some embodiments of the methods, the guest compound is a compound of Formula I-A, Formula I-B, or Formula II where M is $K^+$, and the polymer contains a crown ether macrocycle monomer unit of Formula III, where the sum of n and m is 4, a monomer unit of Formula IV, and a monomer unit of Formula V. In some embodiments of the methods, the guest compound is a compound of Formula I-A, Formula I-B, or Formula II where M is $NH_4$, and the polymer contains a crown ether macrocycle monomer unit of Formula III where the sum of n and m is 6, a monomer unit of Formula IV, and a monomer unit of Formula V. In some embodiments of the methods, the guest compound is a compound of Formula I-A, Formula I-B, or Formula II where M is $Li^+$, and the polymer contains a crown ether macrocycle monomer unit of Formula III, where the sum of n and m is 2, a monomer unit of Formula IV, and a monomer unit of Formula V. In some embodiments of the methods, Y of Formula IV is $C_1$ alkylene, optionally substituted with one or two $R^3$, and C of Formula V is phenylene, optionally substituted with one, two, or three $R^5$. In some embodiments of the methods, one or more $R^3$ of Formula IV are each independently $C_1$ alkyl optionally substituted with one, two, or three halogen, and one or more $R^5$ of Formula V are each independently $C_1$ alkyl optionally substituted with one, two, or three halogen.

EXAMPLES

Example 1—Preparation of Inclusion Complex

Synthesis of dinitrobenzo-18-crown-6-ether (DNA18C6)

10.38 g of dibenzo-18-crown-6 was dissolved in 208 mL chloroform in a 500 mL round bottom flask equipped with a magnetic stirring bar. 156 mL acetic acid was added slowly over 10 min with stirring. 7.2 mL nitric acid together with 20.8 mL acetic acid were added slowly to the solution. The mixture was kept under nitrogen purge and stirring for 1 hour before heating to reflux for 3 hours. Precipitate evolved after 3 hours. The reaction mixture was cooled to room temperature. Precipitates were collected via vacuum filtration and dried at 70° C. for 24 hours to give 6.15 g white powder.

Synthesis of diaminobenzo-18-crown-6-ether (DAB18C6)

A 500 mL three-necked flask with stirring bar and an additional funnel were dried in an oven at 200° C. before use. 6.96 g dinitrobenzo-18-crown-6-ether and 696 mg Pd/C were added to 240 mL anhydrous ethanol in the 500 mL three-necked flask. 49 mL hydrazine hydrate was slowly added to the reaction mixture over 20 min. through an addition funnel, and then the mixture was heated to 90° C. for 5 hours. The reaction mixture was then immediately filtered under vacuum to avoid immediate crystallization. The solution was refrigerated to promote recrystallization, with dry solid crystals collected and dried at 80° C. to give 2.32 g product with purity >99%.

Synthesis of 6FDA-DAM:DAB18C6 co-polyimide (4,4'-hexafluoroisopropylidene) diphthalic anhydride (6FDA) from Akron Polymer Systems was used as received and dried at 160° C. under vacuum overnight before use. 2,4,6-trimethyl-1,3-diaminobenzene (DAM) from Akron Polymer Systems was used as received and dried at 70° C. under vacuum before use. Diaminobenzo-18-crown-6-ether (DAB18C6) was dried at 70° C. under vacuum before use. A 100 mL 3-necked flask, a glass stir rod and a dean-stark trap were dried at 200° C. overnight before use. 2.2757 g of 6FDA, 16 mL of ethanol, and 2 mL of trimethylamine were added to the flask, which was equipped with mechanical stirrer, nitrogen inlet, and dean-stark trap. The dean-stark trap was filled with ethanol. The reaction mixture was heated to reflux under nitrogen flow for 1 hour, followed by distillation of excess of triethylamine and ethanol to form a viscous ester-acid solution. Afterwards, 1 g of diaminobenzo-18-crown-6-ether and 0.3834 g DAM were added with 20 mL NMP and 5 mL o-dichlorobenzene (4/1 v/v). The dean-stark trap was drained and refilled with o-dichlorobenzene, and the reaction was heated gradually to 180° C. under $N_2$ flow. After 48 hours, a viscous solution was precipitated in 150 mL of methanol, and precipitates were collected and dried at 80° C. overnight to give 3.4 g of off-white 6FDA- DAM:DAB18C6 co-polyimide. The product was characterized by NMR in DMSO-d6, which features the absence of amino peaks at ~4.7 ppm, indicating no residual unreacted reactant.

Preparation of KBr-Polymer Inclusion Complex 12.8 mg of a dense film membrane of the 6FDA-DAM:DAB18C6 co-polyimide (diameter about 15 mm) was placed in a 20 mL glass vial equipped with a magnetic stir bar. 10 mL KBr aqueous solution containing 1.38 g of KBr (a crown ether to KBr molar ratio of 1:10) was added to the vial and stirred for 48 hours, to allow full insertion of the $K^+$-containing compound. The film was then washed with DI water and dried under vacuum at 90° C. to yield Membrane 1.

Example 2—Membrane Thermal Properties

Figure 2:
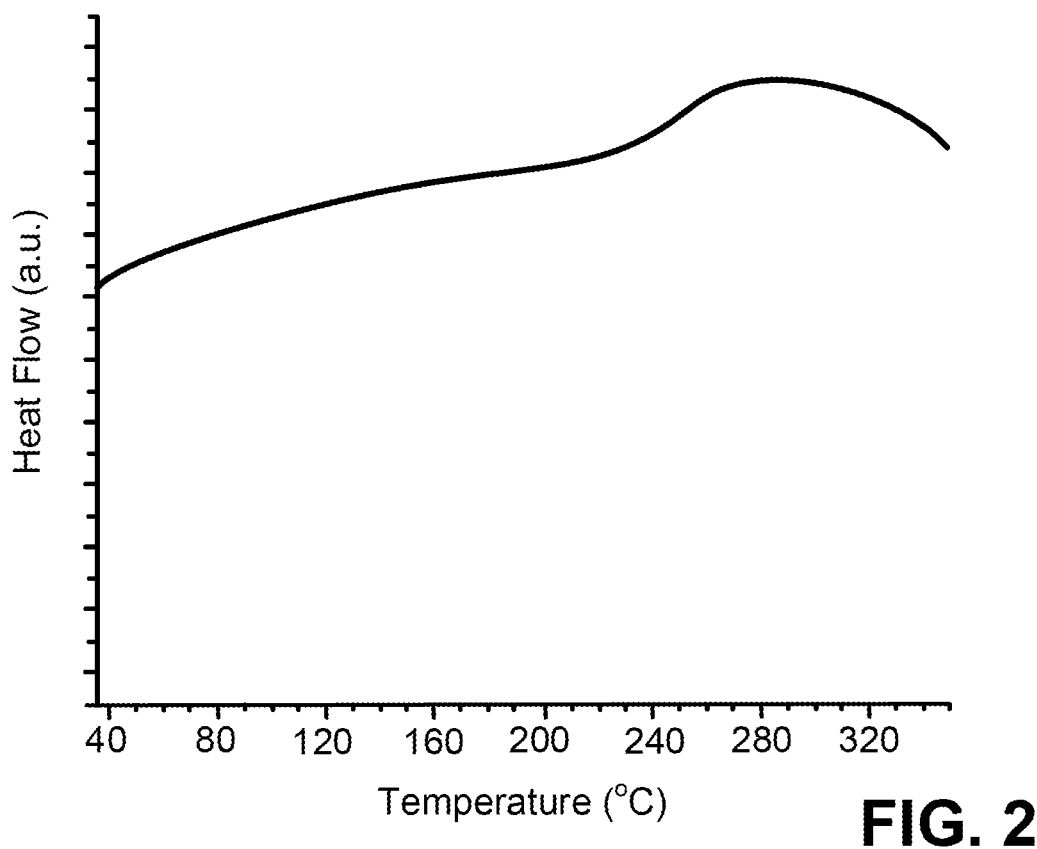
FIG. 2 is a DSC thermograph of a membrane containing 6FDA-DAM:DAB18C6 co-polyimide and KBr.
Figure 3:
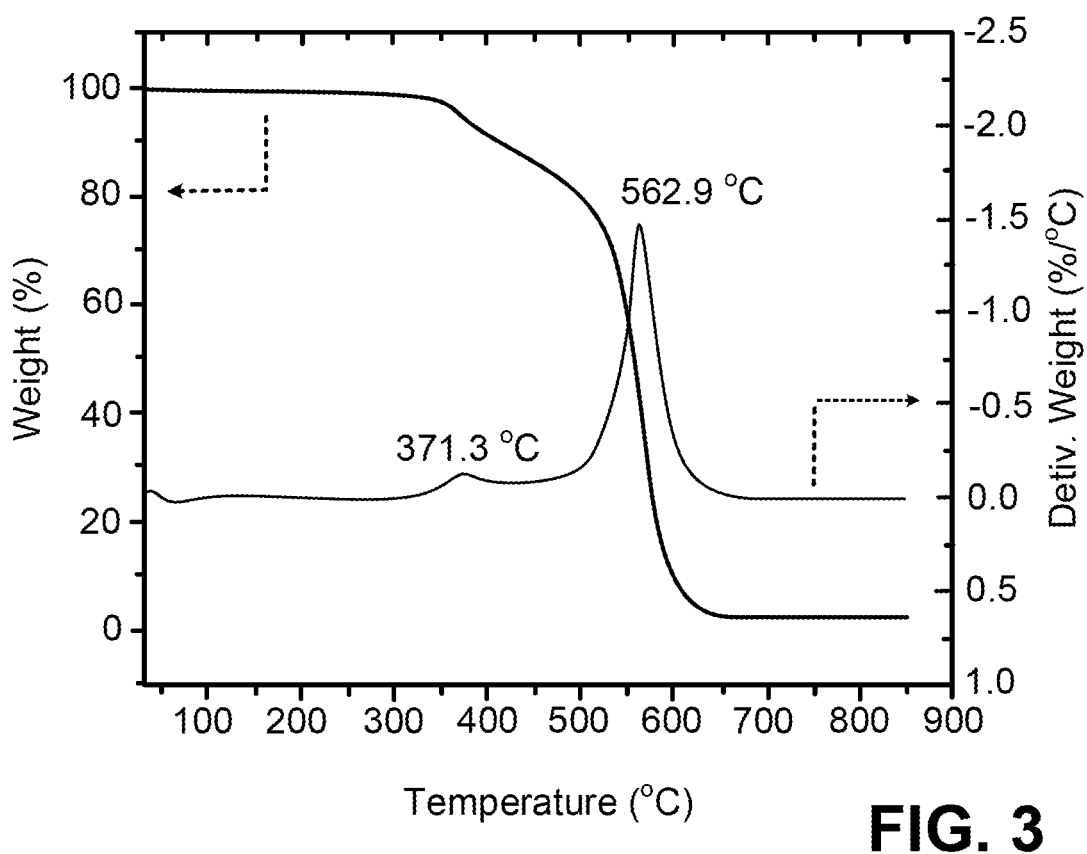
FIG. 3 is a TGA curve of a membrane containing 6FDA-DAM:DAB18C6 co-polyimide and KBr.

The thermal properties of Membrane 1 prepared according to Example 1 were characterized via Differential Scanning Calorimetry (Discovery DSC, 30 to 400° C. at a scanning rate of 10° C./min) and Thermogravimetric Analysis (Discovery TGA, 30 to 800° C. at a scanning rate of 10° C./min), and results are shown in Table 1, below. FIG. 2 is a DSC thermograph of Membrane 1 showing a glass transition temperature ($T_g$) of 250.4° C. The TGA curves shown in FIG. 3 demonstrate a thermal stability of Membrane 1 of up to 350° C. (only 5% and 10% loss at temperature of 368° C. and 412 C°, respectively). The membrane degraded significantly at temperatures greater than 550° C.

TABLE 1

| | $T_g$ (° C.) | $T_d$ @ 5 wt % (° C.) | $T_d$ @ 10 wt % (° C.) |
|---|---|---|---|
| Membrane 1 | 250.4 | 368.5 | 412.0 |

Example 3—Membrane Permeation Properties

Figure 4:
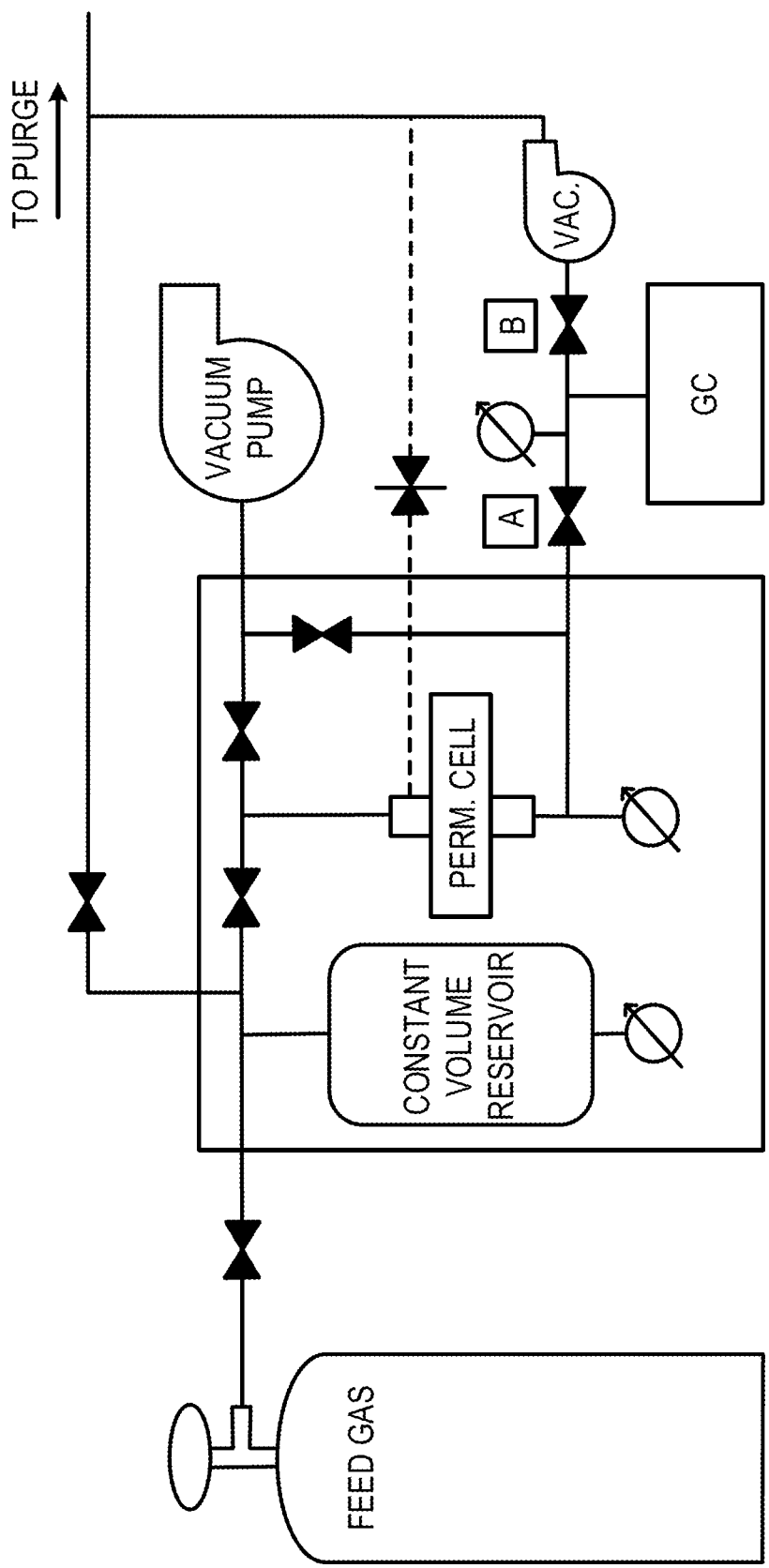
FIG. 4 is a schematic diagram of an exemplary constant-volume, variable pressure permeation apparatus used for measuring single gas and mixed gas permeation properties.

Gas permeation tests were performed in triplicate on Membrane 1 prepared according to Example 1 using a constant-volume, variable-pressure technique. A schematic diagram of this custom-built permeation apparatus is shown in FIG. 4.

A stainless-steel permeation cell with 47 mm disc filters was purchased from EMID Millipore. An epoxy masked membrane sample of 5-20 mm in diameter was inserted and sealed in the testing cell, and the permeation system was completely evacuated for 1 hour before each test. Pure gas permeability coefficients were measured at 25° C. and feed pressure range of 25 to 800 psi in the order of $CH_4$ followed by $CO_2$ to avoid swelling. Steady-state permeation was verified using the time-lag method, where 10 times the diffusion time-lag was taken as the effective steady-state. The upstream (feed) pressure and the downstream (permeate) pressure were measured using Baraton absolute capacitance transducers (MKS Instruments) and recorded using LabVIEW software. The permeate pressure was maintained below 100 torr.

Permeability coefficients of gas i, $P_i$, were calculated according to Equation 1, where $dP_t/d_t$ is the slope of the steady state pressure rise in the downstream, V is the downstream volume, R is the ideal gas constant, T is the temperature of the downstream, L is the membrane thickness (determined via JEOL 7100F scanning electron microscopy images of membrane cross sections), A is the membrane surface area (estimated using ImageJ image processing software), and $\Delta f_i$ is the partial fugacity difference across the membrane calculated using the Peng-Robinson equation. Permselectivity, $\alpha_{i/j}$, was calculated as the ratio of permeability coefficients as expressed in Equation 2.

$$P_i = \frac{dP_i}{d_t} \frac{V L}{R T A \Delta f_i} \quad (1)$$

$$\alpha_{i/j} = \frac{P_i}{P_j} \quad (2)$$

Figure 5:
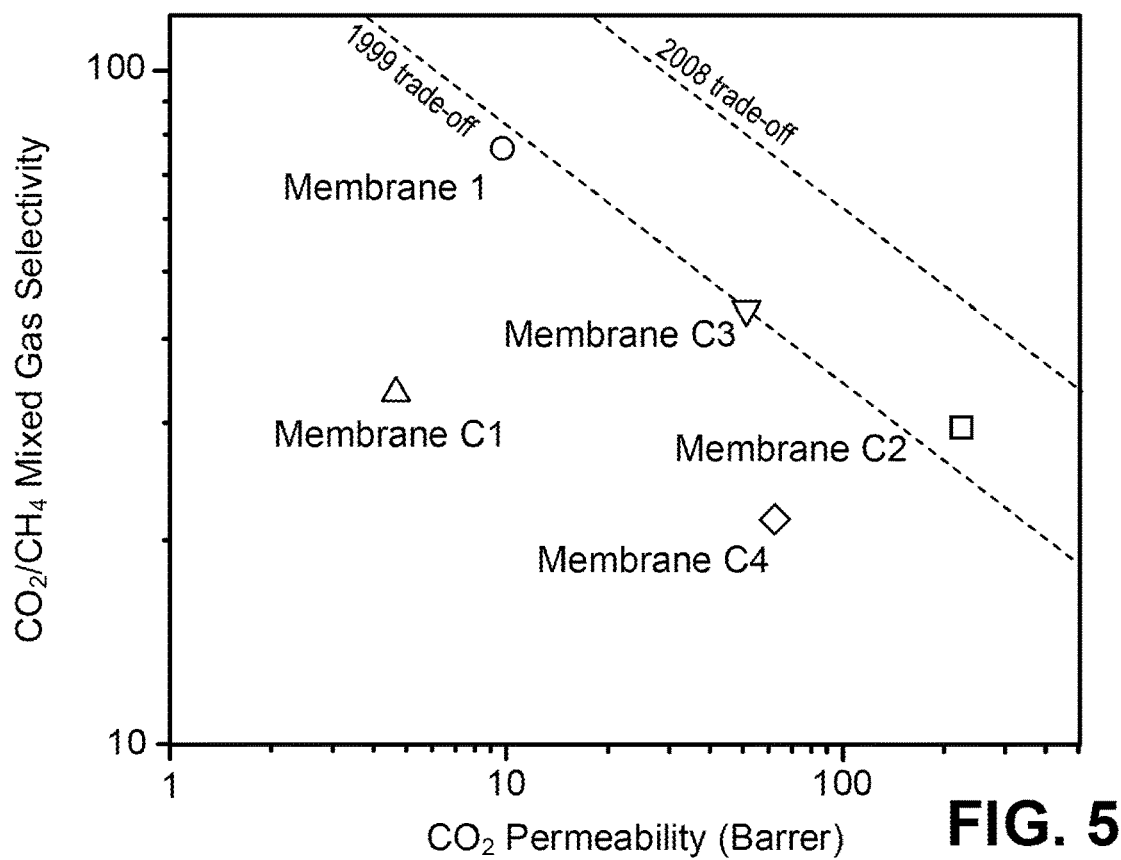
FIG. 5 depicts the membrane permeability-selectivity trade-off ($CO_2/CH_4$ vs. $CO_2$) for a membrane containing 6FDA-DAM:DAB18C6 co-polyimide and KBr and for comparative polymer-based membranes in pure gas (tested at 25° C. and 100 psi).

The pure gas permeation properties for Membrane 1 and comparative glassy polymer-based Membranes C1 (cellulose acetate), C2 (6FDA-DAM polyimide), and C3 (6FDA-DAM: DABA co-polyimide), and rubbery polymer-based Membrane C4 (poly(ether-block-amide) copolymer) are shown in FIG. 5. The results show that the $CO_2/CH_4$ gas separation performance goes along with 1991 Robeson upper bound line. The $CO_2/CH_4$ selectivity of Membrane 1 is located at the far upper left quadrant, indicating enhanced separation performance. Table 2, below, shows the results of testing at 25° C. and feed pressure of 100 psi.

TABLE 2

| Membrane | $P_{CO2}$ (Barrer) | $P_{CH4}$ (Barrer) | $P_{N2}$ (Barrer) | $\alpha CO_2/CH_4$ | $\alpha CO_2/N_2$ |
|---|---|---|---|---|---|
| C1 | 4.64 | 0.14 | — | 33.21 | — |
| C2 | 224.35 | 7.61 | — | 29.47 | — |
| C3 | 51.50 | 1.17 | — | 44.13 | — |
| C4 | 62.81 | 2.91 | 1.10 | 21.61 | 57.20 |
| 1 | 9.70 | 0.13 | 0.38 | 76.34 | 25.38 |

At 25° C. and a feed pressure of 100 psi, Membrane 1 exhibited a $CO_2/CH_4$ selectivity of 76.34, which is a 130%, 159%, 73% and 253% increase as compared to Membrane C1, Membrane C2, Membrane C3 and Membrane C4, respectively. Membrane 1 exhibited higher $CO_2$ permeability compared to Membrane C1, and lower $CO_2$ permeability compared to Membranes C2-C4.

Example 4—$CO_2$ Plasticization Resistance

Figure 6:
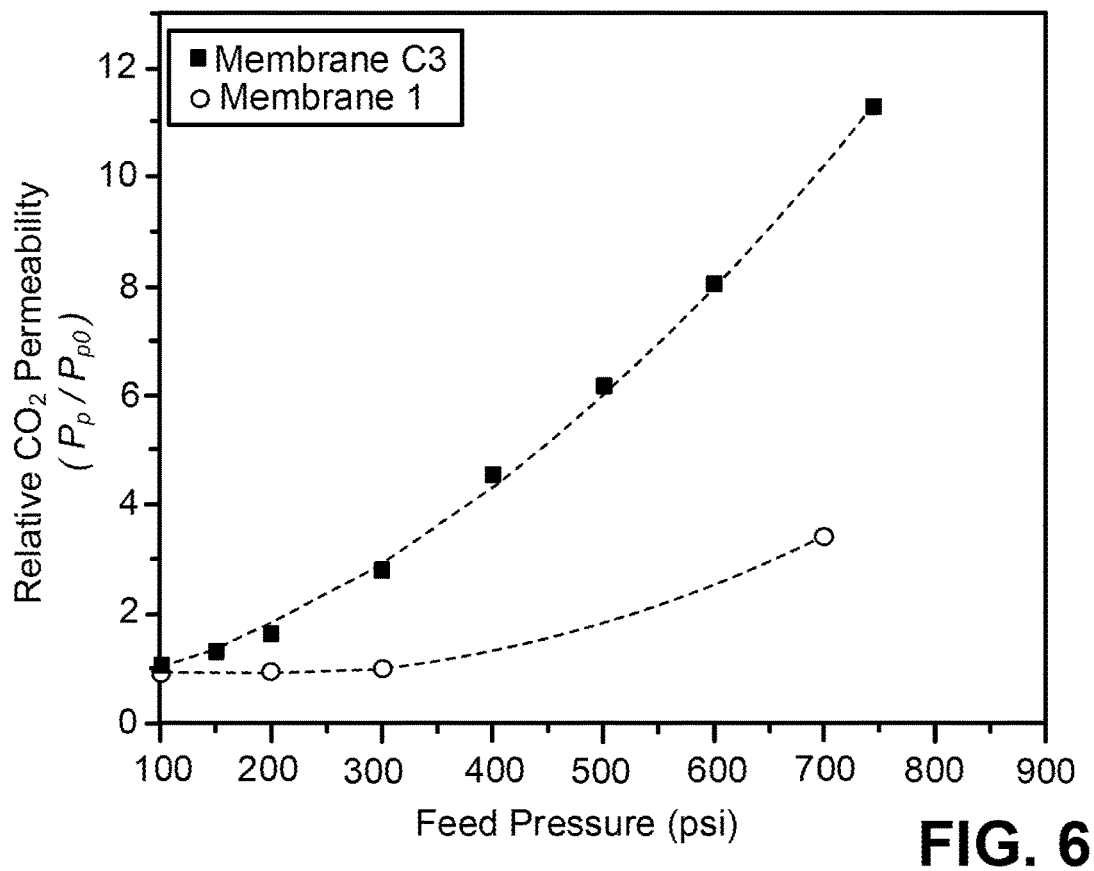
FIG. 6 is a graph showing a comparison of relative $CO_2$ permeability vs. $CO_2$ feed pressure for a membrane containing 6FDA-DAM:DAB18C6 co-polyimide and KBr and for a comparative polymer-based membrane tested under single gas at 25° C.

To study the plasticization resistance of Membrane 1, pure $CO_2$ permeation experiments were performed at increasing $CO_2$ feed pressure up to 750 psi. A substantial increase in the $CO_2$ permeability indicates plasticization. The change of $CO_2$ relative permeability ($P_p/P_{p0}$) with the increase of the applied $CO_2$ pressure at 25° C. was calculated. As can be seen in FIG. 6, comparative Membrane C3 of Example 3 exhibited a 163% and 616% increase in $CO_2$ permeability at 200 psi and 500 psi, respectively, compared to that at 50 psi. When the $CO_2$ applied feed, pressure increased to 700 psi, Membrane C3 exhibited a 1130% increase in $CO_2$ permeability. The significant $CO_2$ permeability increase when applied $CO_2$ feed pressure was increased was due to the $CO_2$ plasticization (or swelling).

In contrast, no plasticization was observed for Membrane 1 up to 300 psi $CO_2$ feed pressure, and Membrane 1 showed only a 200% and 342% increase in $CO_2$ permeability at 500 psi and 700 psi, respectively, compared to that at 50 psi.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A membrane comprising:
   a polymer comprising crown ether macrocycle monomer units; and
   a guest compound comprising at least one functional group capable of binding to at least one of the crown ether macrocycle monomer units, wherein the guest compound is an organic compound comprising one or more carboxylate groups or an inorganic compound comprising a metal salt.

2. The membrane of claim 1, wherein the crown ether macrocycle monomer units comprise one or more of 18-crown-6-ether monomer units, 24-crown-8-ether monomer units, and 12-crown-4-ether monomer units.

3. The membrane of claim 1, wherein the polymer comprises crown ether macrocycle monomer units linked by one or more of an imide group, a bicyclic aliphatic group, an ester group, an amide group, an azo group, and an ether group.

4. The membrane of claim 1, wherein the polymer is a polyimide.

5. The membrane of claim 4, wherein the polymer comprises:
   one or more of dibenzo-18-crown-6-ether monomer units, dibenzo-24-crown-8-ether monomer units, and dibenzo-12-crown-4-ether monomer units;
   bis(phthalimide) monomer units; and
   optionally, benzene monomer units.

6. The membrane of claim 1, wherein the guest compound comprises one, two, or three functional groups capable of binding to at least one of the crown ether macrocycle monomer units.

7. The membrane of claim 1, wherein the guest compound is a salt comprising $K^+$, $NH_4^+$, or $Li^+$.

8. The membrane of claim 1, wherein the guest compound is an oligomer or polymer comprising monomer units comprising the at least one functional group.

9. The membrane of claim 1, wherein the guest compound is a compound of Formula I-A

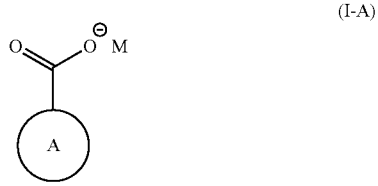

(I-A)

wherein
   A is selected from phenyl, biphenyl, terphenyl, naphthalenyl, anthracenyl, and $C_{1-12}$ alkyl, each optionally substituted with one or more $R^1$;
   each $R^1$ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and
   M is selected from $K^+$, $NH_4^+$, and Lin.

10. The membrane of claim 9, wherein A is substituted with one or two $R^1$, wherein each $R^1$ is independently selected from halogen, hydroxy, amino, and $C_1$ alkyl optionally substituted with one or more $R^{1a}$, wherein each $R^{1a}$ is independently selected from halogen, hydroxy, and amino.

11. The membrane of claim 1, wherein the guest compound is a compound of Formula I-B

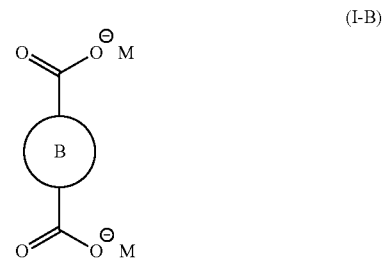

(I-B)

wherein
   B is selected from phenylene, biphenylene, terphenylene, naphthalenylene, anthracenylene, and $C_{1-12}$ alkylene, each optionally substituted with one or more $R^1$;
   each $R^1$ is independently selected from halogen, hydroxy, amino, thio, carboxy, azido, and $C_{1-4}$ alkyl optionally substituted with one or more $R^{1a}$, wherein each $R^{1a}$ is independently selected from halogen, hydroxy, amino, thio, carboxy, and azido; and
   M is selected from $K^+$, $NH_4^+$, and $Li^+$.

12. The membrane of claim 11, wherein B is substituted with one or two $R^1$, wherein each $R^1$ is independently selected from halogen, hydroxy, amino, and $C_1$ alkyl optionally substituted with one or more $R^{1a}$, wherein each $R^{1a}$ is independently selected from halogen, hydroxy, and amino.

13. The membrane of claim 1, wherein the guest compound is an oxalate salt.

14. The membrane of claim 1, wherein the guest compound is a compound of Formula II

(II)

wherein
   M is selected from $K^+$, $NH_4^+$, and $Li^+$;
   X is selected from $OH^-$, $CO_3^{2-}$, $C_2O_4^{2-}$, $F^-$, $Cl^-$, $Br^-$, $I^-$, $MnO_4^-$, $PO_4^{3-}$, $SO_4^{2-}$, and $NO_3^-$; and
   n is selected such that the overall charge of the compound of Formula II is 0.

15. The membrane of claim 1, wherein the ratio of the functional groups present in the membrane to the crown ether macrocycle monomer units present in the membrane is within the range of about 20:1 to about 1:20.

16. The membrane of claim 1, wherein the polymer and the guest compound comprise at least about 80 wt % of the membrane.

* * * * *

UNITED STATES PATENT AND TRADEMARK OFFICE
CERTIFICATE OF CORRECTION

PATENT NO. : 12,434,204 B2
APPLICATION NO. : 17/550069
DATED : October 7, 2025
INVENTOR(S) : Hasmukh A. Patel et al.

Page 1 of 1

It is certified that error appears in the above-identified patent and that said Letters Patent is hereby corrected as shown below:

In the Claims

In Column 26, Line 4, Claim 9, please replace "Lin" with -- $Li^+$ --.

Signed and Sealed this
Twenty-fifth Day of November, 2025

John A. Squires
*Director of the United States Patent and Trademark Office*